United States Patent
Besset-Bathias et al.

(10) Patent No.: US 7,024,202 B2
(45) Date of Patent: Apr. 4, 2006

(54) METHOD OF PROCESSING UMTS CALLS IN A PACKET TRANSMISSION NETWORK AND NODE FOR THE UMTS NETWORK AND FOR IMPLEMENTING SAID METHOD

(75) Inventors: Claire Besset-Bathias, Neuilly sur Seine (FR); Francis Bourriaud, Longjumeau (FR); Jean-Marc Ballot, Courbevoie (FR)

(73) Assignee: Alcatel, Paris (FR)

( * ) Notice: Subject to any disclaimer, the term of this patent is extended or adjusted under 35 U.S.C. 154(b) by 56 days.

(21) Appl. No.: 10/483,082

(22) PCT Filed: Jul. 4, 2002

(86) PCT No.: PCT/FR02/02346

§ 371 (c)(1),
(2), (4) Date: Jan. 8, 2004

(87) PCT Pub. No.: WO03/009629

PCT Pub. Date: Jan. 30, 2003

(65) Prior Publication Data

US 2004/0176098 A1 Sep. 9, 2004

(30) Foreign Application Priority Data

Jul. 9, 2001 (FR) .................................. 01 09087

(51) Int. Cl.
*H04Q 7/20* (2006.01)
*H04L 12/26* (2006.01)

(52) U.S. Cl. ............................... 455/452.2; 455/432.3; 370/230

(58) Field of Classification Search ............. 455/452.2, 455/445, 403, 423, 436, 432.3; 370/230, 370/252; 709/246
See application file for complete search history.

(56) References Cited

U.S. PATENT DOCUMENTS 5,956,637 A * 9/1999 Ericsson et al. ......... 455/432.3

(Continued)

FOREIGN PATENT DOCUMENTS

WO    WO 00/12447 A    3/2000

(Continued)

*Primary Examiner*—William Trost
*Assistant Examiner*—Kiet Doan
(74) *Attorney, Agent, or Firm*—Sughrue Mion, PLLC

(57) ABSTRACT

In order to accept a new call for setting up in a UMTS network node, the method consists in particular in:
  calculating for the new call an equivalent passband as a function of:
    the quality of service requested for the new call; and
    the quality of service attributes of the UMTS medium corresponding to the call;
  then comparing the sum of the equivalent passband for the new call plus the equivalent passbands of all of the calls already set up in the UMTS network node with a predetermined maximum value; and
  accepting the new call with guaranteed requested quality of service only if the sum is less than or equal to said predetermined maximum value.

8 Claims, 3 Drawing Sheets

U.S. PATENT DOCUMENTS

| | | |
|---|---|---|
| 6,216,006 B1 | 4/2001 | Scholefield |
| 6,363,252 B1 * | 3/2002 | Hamalainen et al. ....... 455/436 |
| 6,490,452 B1 * | 12/2002 | Boscovic et al. ........... 455/436 |
| 6,650,905 B1 * | 11/2003 | Toskala et al. ............. 455/522 |
| 6,757,245 B1 * | 6/2004 | Kuusinen et al. ........... 370/230 |
| 6,785,243 B1 * | 8/2004 | Åberg ....................... 370/252 |
| 6,807,419 B1 * | 10/2004 | Laiho et al. ................ 455/436 |
| 6,845,100 B1 * | 1/2005 | Rinne .................... 370/395.43 |
| 6,847,610 B1 * | 1/2005 | Suumaki et al. ......... 370/230.1 |
| 2002/0004379 A1 * | 1/2002 | Gruhl et al. ................ 455/403 |
| 2002/0032800 A1 * | 3/2002 | Puuskari et al. ............ 709/246 |
| 2002/0128005 A1 * | 9/2002 | Aberg ....................... 455/423 |

FOREIGN PATENT DOCUMENTS

WO     WO 00/49824 A     8/2000

* cited by examiner

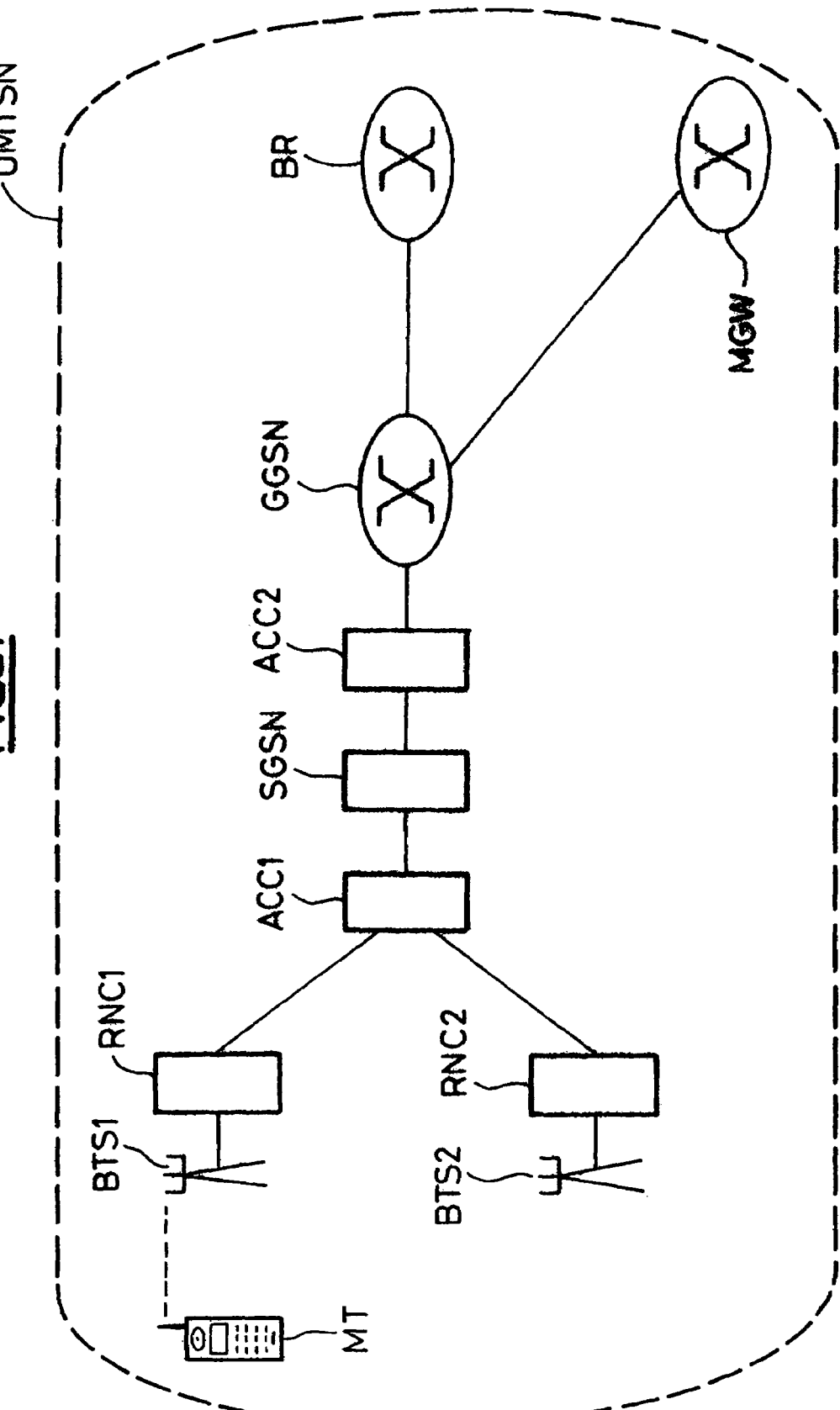
FIG_1

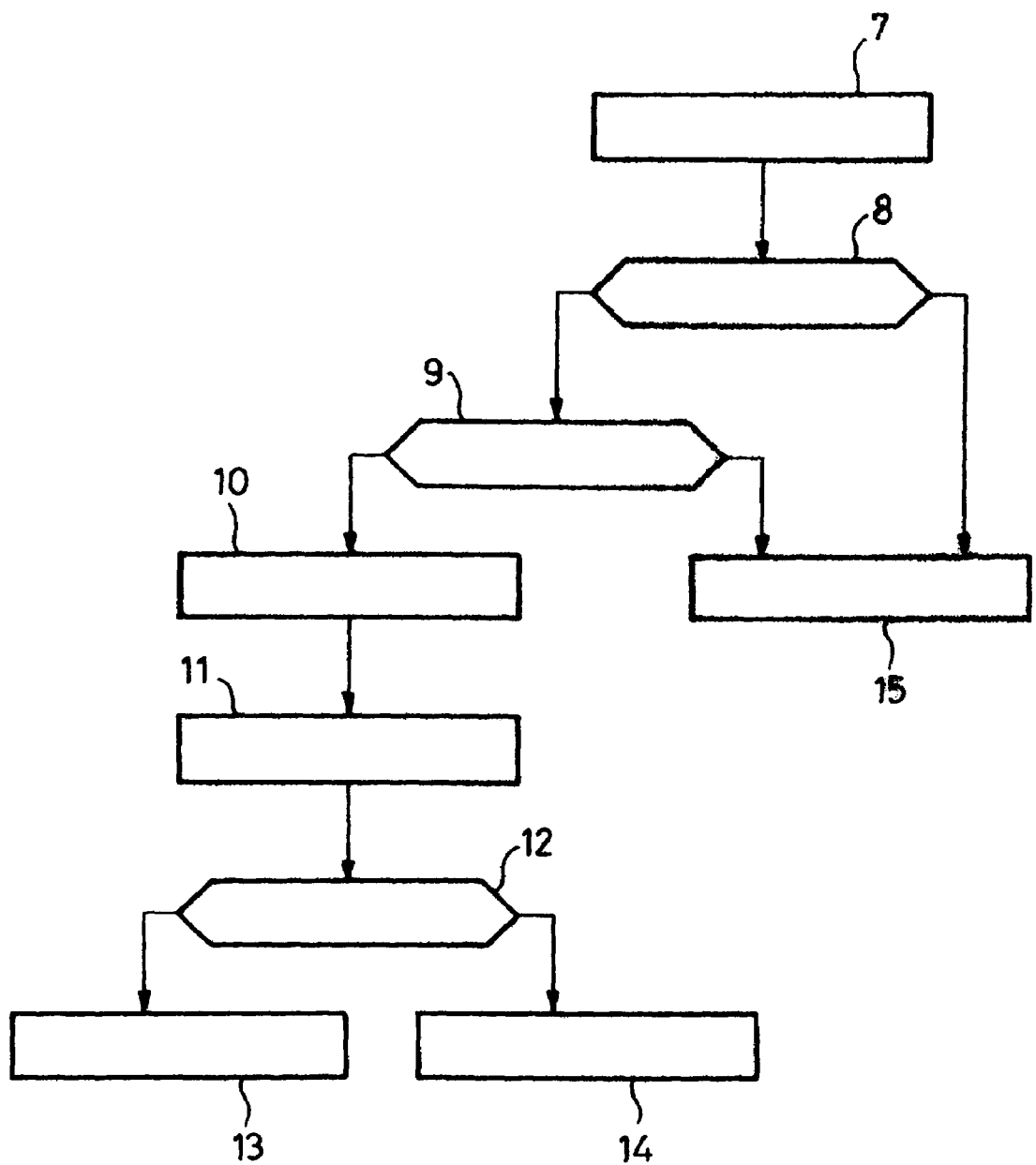

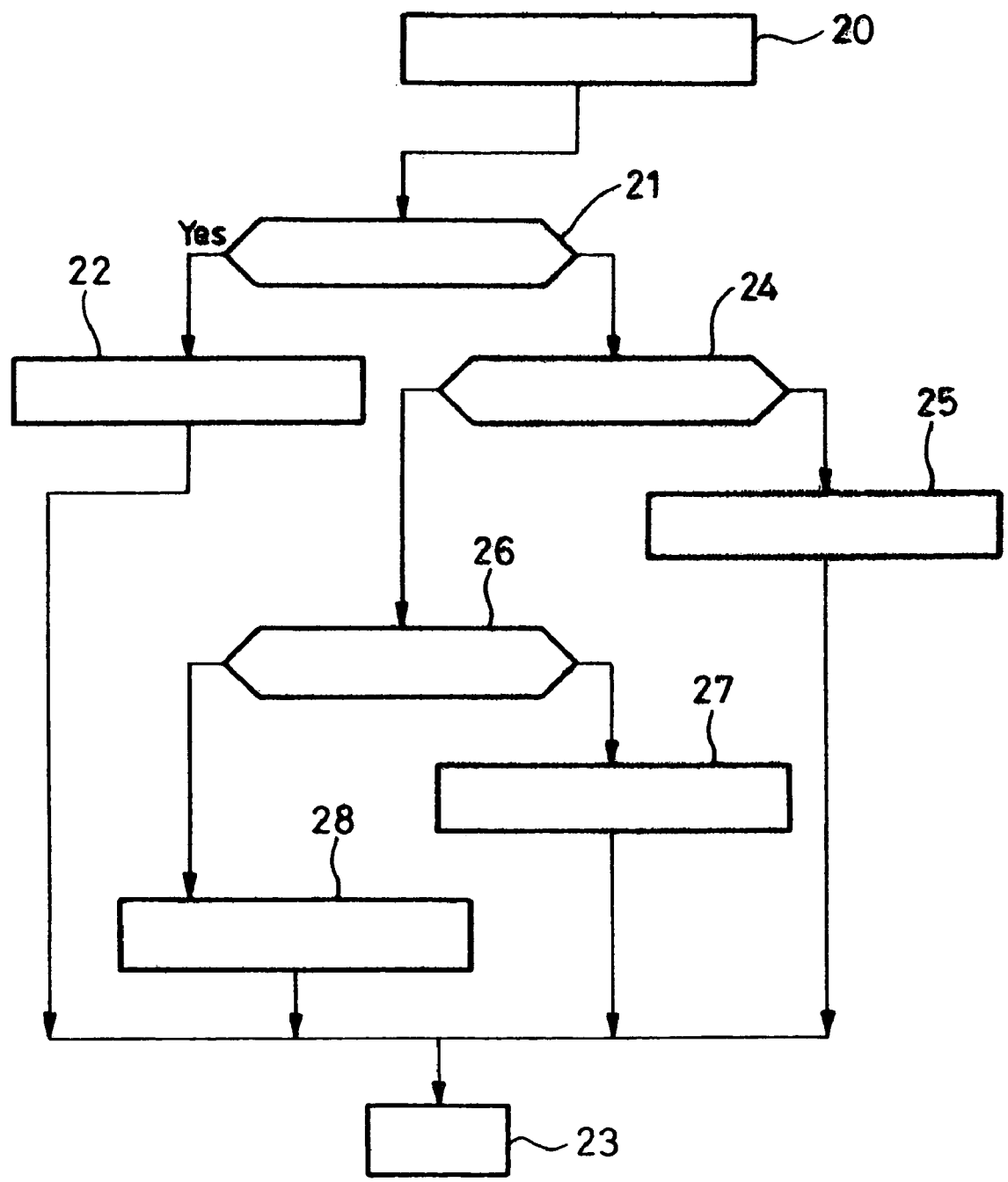
FIG_3

METHOD OF PROCESSING UMTS CALLS IN A PACKET TRANSMISSION NETWORK AND NODE FOR THE UMTS NETWORK AND FOR IMPLEMENTING SAID METHOD

The invention relates to a method of processing UMTS calls in a packet transmission network, and to a node for implementing the method. The universal mobile telecommunications system (UMTS) is a mobile telephone system of the third generation. This system has a network core constituted by a network for transmitting data packets.

The mobile telephone system presently in use in Europe is a second generation system (the GSM or "global system for mobile communications") that is essentially designed to supply telephony and data transmission services in circuit mode, together with a small number of remote services in packet mode, such as the short message service (SMS). It comprises a core network essentially constituted by a circuit switched network. A radio subsystem serves to allocate radio traffic channels in circuit mode and to maintain the continuity of established calls for mobile users by means of inter-cell transfer procedures. Quality of service relies mainly on the quality of the circuit switched fixed network.

Data services represent only a marginal fraction of the overall traffic so quality of service criteria are mainly: the probability of being blocked during the busy hour; the call cutoff rate; and subjective voice quality. In this context, frequency planning and radio resource dimensioning are of major importance in providing appropriate radio coverage and traffic capacity.

Recent developments, such as adaptive multi-data rate encoding and transcoding-free operation in the radio subsystem seek to improve the quality of service of the mobile telephone in circuit mode. With the expansion of the Internet, general packet radio services (GPRS) have been introduced to provide data services that are effectively in packet mode from end to end in GSM networks. In spite of the efforts made by standards organizations for refining the management of quality of service by taking account of the need to distinguish between applications and subscribers, present GPRS systems are generally considered as providing "best effort" service. Nevertheless, under the control of the core network, it is possible to supply relative quality of service levels.

Second generation systems were developed for conveying voice, at a time when 75% of the traffic carried by European operators was essentially telephone traffic. They were optimized to keep voice synchronization in phase and to offer telephone services by making use of a network of intelligent architecture. The introduction of the Internet was accompanied by an increase in data traffic. The question now arises of deploying a mobile network which is adapted both to conveying Internet traffic and voice traffic.

Third generation systems will improve the situation considerably for all types of service (telephony, data, or multimedia services), since quality of service management is one of the concepts underlying the specifications drawn up in the context of the third generation partnership project (3GPP). Third generation systems are designed to use a common transmission medium, whether radio or terrestrial, for transporting applications in packet mode and in circuit mode. Information coming from various independent sources is multiplexed over a common transmission medium. The UMTS infrastructure should therefore cope with different kinds of traffic having bandwidth and quality of service requirements that are very different from one another.

The traffic generated by data transfer services and by Internet access services is particularly sporadic and unpredictable. Data transmission between machines accommodates losses poorly but is generally not sensitive to end-to-end transmission time or jitter. In contrast, speech, and more generally all real time applications can tolerate reasonable rates of loss but they require transmission times that are strictly limited. For example, end-to-end transmission time for voice must remain less than 400 milliseconds (ms), even when using echo cancellers.

One of the main difficulties in making the UMTS infrastructure is thus transporting data for different types of application over the same medium while complying with fixed objectives for quality of service.

In order to satisfy these requirements, the 3GPP has defined four classes of quality of service (Recommendation TS 23.107) respectively for conversation, streaming, interactive, and background applications. The table below gives examples of applications associated with the various classes of quality of service, and specifies the quality of service attributes used for defining these classes of quality of service in a UMTS system.

| Type of traffic | Delay | Delay variation | Low bit error rate | Guaranteed bit rate | Examples |
| --- | --- | --- | --- | --- | --- |
| Conversational traffic | Strict | Strict | No | Yes | Voice over IP (VoIP), video conferencing, audio-conferencing |
| Streaming traffic | Limited | Limited | No | Yes | Broadcast services (audio, video), news, sports |
| Interactive traffic | Limited | No | Yes | No | Web browsing, cyber chat, games, mobile trading |
| Background traffic | No | No | Yes | No | E-mail, SMS, downloading databases, transferring measurements |

It is also essential that the transmission resources of the UMTS infrastructure should be used efficiently (radio spectrum, but also terrestrial transmission resources), particularly in the access portion: it must enable a transfer service to be supplied at low cost, minimizing investment expenditure and operating costs. It is essential to achieve a statistical multiplexing gain. In particular, it is necessary to load the transmission links and the radio interface to the greatest possible extent while satisfying quality of service requirements. Consequently, the search for load optimizing is of very great importance.

One of the means for achieving such optimization is to process calls at UMTS application level. This decides whether a UMTS call can be accepted by the UMTS call network, given the fact that it must guarantee a predetermined quality of service to an established call throughout its duration, and that it must also maintain the quality of service for other UMTS calls that have already been established. This call processing is performed in all of the ports and all of the nodes of a UMTS network. Account needs to be taken of the fact that data packets are stored temporarily in buffer memories of capacity that is limited.

The object of the invention is to propose a method of processing UMTS calls at UMTS application level which is simple, fast, efficient, and robust (i.e. which operates equally well under heavy loading as under light loading).

The invention provides a method of processing UMTS calls in a packet transmission network, the network comprising nodes for a UMTS network, the method being characterized in that in order to accept a new UMTS call for setting up in a UMTS network node, it consists in particular in:

calculating for the new call an equivalent passband as a function of:
the quality of service requested for the new call; and
the quality of service attributes of the UMTS medium corresponding to the call;
then comparing the sum of the equivalent passband for the new call plus the equivalent passbands of all of the calls already set up in the UMTS network node with a predetermined maximum value; and
accepting the new call with guaranteed requested quality of service only if the sum is less than or equal to said predetermined maximum value.

The invention also provides a node for a packet transmission network supporting a UMTS radio system, for implementing the method, the node being characterized in that it comprises:

means for calculating for each new call an equivalent passband as a function of:
the quality of service requested for the new call; and
the quality of service attributes of the UMTS medium corresponding to the call;
means for comparing the sum of the equivalent passband for the new call plus the equivalent passbands for all of the calls already set up in the UMTS network node with a predetermined maximum value; and
means for accepting the new call while guaranteeing the requested quality of service only if the sum is less than or equal to said predetermined maximum value.

The invention will be better understood and other characteristics will appear on reading the following description and the accompanying figures:

FIG. 1 is a block diagram of an example of a UMTS network;

FIG. 2 is a flow chart for an implementation of the method of the invention; and FIG. 3 shows a portion of said flow chart in greater detail.

The example UMTS network (UMTSN) shown in FIG. 1 comprises:

asynchronous transfer mode (ATM) type cross-connects, ACC1 and ACC2;
a gateway GPRS support node, GGSN;
a serving GPRS support node, SGSN;
a border router BR connected to a circuit switched (CS) client site;
a multimedia gateway MGW;
remote access nodes RNC1 and RNC2; and
a radio subsystem made up of base stations BTS1 and BTS2 connected respectively to the remote access nodes RNC1 and RNC2, and connected to terminals MT by radio links.

The cross-connects ACC1 and ACC2, the gateway GPRS support node, GGSN, and the serving GPRS support nodes, SGSN are interconnected by a network making use of the Internet protocol so as to constitute the core of the UMTS network.

Mechanisms for providing full support for quality of service are installed at all levels in the UMTS system.

At application level, call admission control is used at each node of the UMTS network. Mechanisms for managing waiting queues fairly, and mechanisms for controlling congestion, enabling the various different qualities of service required by subscriber applications are thus performed within:

the gateway GPRS support node, GGSN;
the serving GPRS support nodes, SGSN;
the remote access nodes RNC1 and RNC2; and
the multimedia gateway MGW.

In addition, a policing function is provided in the serving GPRS support node(s), SGSN for traffic entering the core of the network (going to the cross-connect ACC2).

At network layer level, quality of service support is performed by conventional IP differentiated services (DiffServ).

At link layer level, it is possible to use a multiprotocol label switching (MPLS) environment with stream labelling on interfaces known as Gn and Gi; and it is possible to use asynchronous transfer mode (ATM) on an interface known as Iu.

Controlling call admission at application level is based on the concept of equivalent passband. It consists in estimating the resources needed for obtaining the requested quality of service; and in determining whether or not these resources are available. If they are available, then they are reserved. If they are not available, then another procedure enables the requested quality of service to be reduced (if permitted by the application).

Call admission control is activated by the following events:

each time a UMTS or GSM call is set up in packet mode;
each time there is a modification to quality of service:
on each change of serving GPRS support node, SGSN, due to the mobility of a subscriber.(change of quality of service in the new node SGSN, at its initiative);
requested by a mobile terminal (i.e. on receiving a change-of-context request); or
requested by a gateway GPRS support node, GGSN (i.e. on receiving a request to update context);
on a modification in the packet stream in the radio subsystem, at the request of said subsystem;
during a request for service procedure (while reestablishing a radio access communications channel, after a service request);
after a procedure for updating subscription parameters leading to a change in quality of service (on the request of the subscriber's name register);
periodically, for contexts in which quality of service has been reduced (so as to make it possible subsequently to offer a better quality of service if new resources become available);
in the event of a mobile terminal being transferred between cells ("handover");
in the event of relocalization of a serving radio network subsystem, i.e. in the event of the mobile terminal going into a cell served by another remote access RNC node;
a change in the serving GPRS support node, SGSN of a mobile terminal; or
a change in the gateway GPRS support node, GGSN of a mobile terminal.

Nevertheless, in any given SGSN or GGSN node, call admission control can be activated only by a subset of those events. Furthermore, in order to guarantee quality of service in all layers (and not only at UMTS application level), another call admission control takes account of resources available in the IP transport layer. Another call admission control is also active at link layer level (ATM and/or MPLS).

At UMTS application level, certain mechanisms isolate traffic coming from each UMTS user equipment. By way of example, mention can be made of mechanisms for managing queues and congestion that are implemented within serving GPRS support nodes, SGSN, and gateway GPRS support nodes, GGSN, or indeed the policing function and the traffic flow models implemented within the GGSN node.

Ordering techniques, such as fair management of queues with waiting or cyclical ordering with waiting enable conflicts for use of a resource to be managed. They guarantee that a certain minimum passband is allocated to each context. They provide an implicit policing function with the advantageous feature that this function comes into play only when the network element is heavily loaded. The implicit policing is a function that is needed in order to be able to comply with the undertaking made with a user concerning quality of service: if the network becomes heavily loaded, this policing function verifies that the behavior of the user is indeed in compliance with the user's traffic contract in order to ensure that a user whose behavior is illicit (whether deliberately or otherwise) cannot degrade the quality of service supplied to other users.

FIG. 2 is a flow chart of an implementation of the method of the invention for controlling admission of a new call on entry to a UMTS network node under consideration. It comprises a step of calculating equivalent passband as a function of traffic parameters that appear in the context of a call and that are defined by a contract with the subscriber requesting that a call be set up. This equivalent passband serves to represent resource requirements so as to be able to add up resource requirements and share available resources.

Step 7: A trigger event from amongst those mentioned above triggers the admission control procedure.

Step 8: The number of activated contexts, i.e. the number of calls already set up in the UMTS network node under consideration is compared with a maximum value M that is set as a function of the characteristics of this UMTS network node; if the number of activated contexts is greater than M:

Step 15: the request is rejected.

If the number of activated contexts is less than M:

Step 9: the requested quality of service is compared with that mentioned in the subscription contract.

If the requested quality of service level is greater than that mentioned in the subscription contract:

Step 15: the request is rejected.

If the requested quality of service is less than or equal to that mentioned in the subscription contract:

Step 10: the equivalent passband is calculated for the new call and for each of the calls that are already set up in the UMTS network node under consideration, using a method described below.

Step 11: The equivalent passbands correspond to all of these calls are summed.

Step 12: This sum is compared with the passband R that is available at the instant under consideration in the UMTS network node under consideration.

Step 13: If the sum is greater than R, the quality of the new call is reduced (if that is possible) or else the new call is rejected (if it is not possible to reduce its quality).

Step 14: If the sum is less than or equal to R, the new call is accepted, and the corresponding resources are reserved. A "CREATE PDP CONTEXT" message is sent by the serving GPRS support node, SGSN to the gateway GPRS support node, GGSN. If this node GGSN responds in the negative because it cannot supply the requested bit rate, then the serving GPRS support node SGSN can attempt to activate the same context in another gateway GPRS support node, GGSN. If the node GGSN reduces the quality of service, then the node SGSN modifies the data recorded concerning the resources that have been reserved.

When a context is deactivated (end of a call or movement of a user), its equivalent passband is no longer taken into account in step 11 of summing passbands.

FIG. 3 shows, in greater detail, the operation 10 of calculating the equivalent passband corresponding to a call. This particular procedure is given by way of example. The method of the invention can be implemented with other procedures for calculating equivalent passband.

Step 20: Starting the procedure for calculating equivalent passband on the basis of the context of a call.

Step 21: Testing the class of traffic contained in the context:

If the traffic is conversational:

Step 22: Calculating the equivalent passband using the formula: EB=Min[MBR, GBR+alpha(MBR−GBR)], where MBR is the maximum bit rate, and GBR is the guaranteed bit rate, which are quality of service attributes, and which form part of the context of the new call, and where alpha is a constant;

Step 23: end of procedure.

If the traffic is not conversational: Step 24: test the class of traffic contained in the context.

If the traffic is streaming:

Step 25: calculate the equivalent passband using the formula: EB=Min[MBR, GBR+beta(MBR−GBR)], where beta is a constant;

Step 23: end of the procedure.

If the traffic is not streaming: Step 26: test the class of traffic contained in the context.

If the traffic is interactive:

Step 27: calculate the equivalent passband using the formula: EB=MRB·b where b is a constant which is a function of the processing priority level of the traffic (a value which is fixed by default or fixed by a network manager);

Step 23: end of the procedure.

If the traffic is not interactive:

Step 28: calculating the equivalent passband using the formula: EB=Min(C0, MBR) where C0 is a constant of small value, e.g. 10 bits per second;

Step 23: end of the procedure.

The constants alpha, beta, b, and C0 are selected by the operator of the network as a function of network management policy. The values of the parameters MBR, GBR, and the other quality of service attributes form part of the context of each call and they are compared with contractual values for the same parameters stored in the name location register that manages the subscriber requesting that a call be set up. For various UMTS media services, quality of service attributes are given in the table below for each class of traffic.

| Attributes | Traffic class | | | |
| --- | --- | --- | --- | --- |
| | Conversational traffic | Streaming traffic | Interactive traffic | Background traffic |
| Maximum bit rate MBR | X | X | X | X |

-continued

| Attributes | Traffic class | | | |
|---|---|---|---|---|
| | Conversational traffic | Streaming traffic | Interactive traffic | Background traffic |
| Delivery in the right order | X | X | X | X |
| Maximum size of a service data unit (SDU) | X | X | X | X |
| SDU format information | X | X | | |
| SDU error rate | X | X | X | X |
| Residual bit error rate | X | X | X | X |
| Return of erroneous SDUs | X | X | X | X |
| Transfer delay | X | X | | |
| Guaranteed bit rate GBR | X | X | | |
| Traffic processing priority | | | X | |
| Allocation/ retention priority | X | X | X | X |

The function of controlling call admission can be used within an SGSN or a GGSN node to verify that the resources needed for setting up a call are available in the node. However they could also be used from outside a node in order to verify that the interfaces Gn, Iu, and Gi of the node have the necessary resources. Consequently, the equivalent passband R actually available in a node can be equal:
   either to the equivalent passband of the processor of the node, SGSN or GGSN;
   or to the equivalent passband of an ATM virtual circuit on an interface Iu, Gn, Gi;
   or the physical passband of a link or of a router;
   or the passband of an MPLS tunnel on a Gn or Gi interface;
   or the passband of a DiffServ class (EF or Afx or BE) or of a group of classes.

Firstly, the quality of service allocated to a call may be reduced to its contractual value in autocratic manner, if the requesting terminal has requested a quality of service greater than the contractual value. During the call, the actual quality of service may be increased or decreased, but it is always less than or equal to that initially requested when setting up the call in question.

A procedure for reducing quality of service is called when the requested equivalent passband is not available. For conversational traffic and for streaming traffic, the procedure for reducing quality of service can be based only on reducing the guaranteed bit rate. The requesting application may refuse such a reduction, or it may accept it and then select another encoding algorithm or another coder in order to be capable of operating with a passband that is smaller than that requested. The decision is taken by the final user, not by the network.

For traffic that is interactive or streaming, the procedure for reducing quality of service is based on the processing priority that has been requested for the traffic. If the requested equivalent passband is not available, then the quality of service is reduced to correspond to the nearest level below the processing priority of the traffic. If the requested equivalent passband is still not available when the quality of service is reduced in this way, then background traffic class may be proposed to the user.

Quality of service is never increased above the contractual value. Call admission control can be called when changing the serving GPRS support node, SGSN due to the subscriber moving. Quality of service might then be increased as a function of the quality of service initially allocated, or the quality of service negotiated by an earlier SGSN node. Similarly, but only for calls which have had their quality of service reduced, quality of service may be increased by periodically calling the call admission control function in order to be able to offer a better quality of service if resources become available.

Call admission control may also be a function of a parameter referred to as allocation/retention priority, which is defined in the subscription contract. It enables certain subscribers to be given priority when setting up calls, e.g. VIPs, fire brigades, police services, etc. If the requested passband is not available, call admission control can decide:
   to reduce quality of service (while retaining the same class of service), in the event of the allocation/retention priority parameter not being used by the network operator;
   to attempt to supply the requested passband by making use of the allocation/retention priority parameter to select amongst calls that have already been set up, a call that is to be interrupted; or
   to use the allocation/retention priority parameter during a procedure between serving GPRS support nodes SGSN: if the parameter is equal to a medium value, and only for a call that has already been set up, the new node may attempt to conserve the quality of service negotiated by the preceding SGSN node. To do this, it may interrupt certain calls having the lowest allocation/retention priority.

The invention claimed is:

1. A method of processing UMTS calls in a packet transmission network, the network comprising UMTS network nodes;
   the method being characterized in that in order to accept a new UMTS call for setting up in a UMTS network node, it consists in particular in:
      calculating for the new call an equivalent passband as a function of:
         the quality of service requested for the new call; and
         the quality of service attributes of the UMTS medium corresponding to the call;
      then comparing the sum of the equivalent passband for the new call plus the equivalent passbands of all of the calls already set up in the UMTS network node with a predetermined maximum value; and
      accepting the new call with guaranteed requested quality of service only if the sum is less than or equal to said predetermined maximum value.

2. A method according to claim 1, characterized in that implementation is triggered in particular by one of the following events;
   a request to set up a call in UMTS or GSM packet mode;
   a change of quality of service, initiated by a mobile terminal or by the network;
   a change of radio subsystem (BTS, RNC) serving a mobile terminal;
   a change in the gateway GPRS support node (GGSN) of a mobile terminal; or a change in the serving GPRS support node (SGSN) of a mobile terminal.

3. A method according to claim 1, characterized in that it further consists in reducing quality of service when the requested equivalent passband is not available;
   in that for conversational and streaming traffic, a reduction in quality of service is based on reducing guaranteed bit rate; and
   in that for interactive or streaming traffic, the procedure for reducing quality of service is based on the processing priority that has been requested for the traffic; and
   in that if the requested equivalent passband is still not available when the quality of service is reduced, then background class traffic is proposed to the user.

4. A method according to claim 1, characterized in that if the quality of service guaranteed to a call is less than that requested, it consists in periodically repeating the operations specified in claim 1 to offer a better quality of service if resources have become available.

5. A node for a UMTS network, for a packet transmission network supporting a UMTS radio telephone system, the UMTS network node being characterized in that it comprises:
   means for calculating for each new call an equivalent passband as a function of:
      the quality of service requested for the new call; and
      the quality of service attributes of the UMTS medium corresponding to the call;
   means for comparing the sum of the equivalent passband for the new call plus the equivalent passbands for all of the calls already set up in the UMTS network node with a predetermined maximum value; and
   means for accepting the new call while guaranteeing the requested quality of service only if the sum is less than or equal to said predetermined maximum value.

6. A UMTS network node according to claim 5, characterized in that the means for calculating equivalent passband for each new call are triggered by:

a request to set up a call in UMTS or GSM packet mode;

a change of quality of service, initiated by a mobile terminal or by the network;

a change of radio subsystem (BTS, RNC) serving a mobile terminal;

a change in the gateway GPRS support node (GGSN) of a mobile terminal; or a change in the serving GPRS support node (SGSN) of a mobile terminal.

7. A UMTS network node according to claim 5, characterized in that it further comprises means for reducing quality of service when the requested equivalent passband is not available;
   in that for conversational and streaming traffic, a reduction in quality of service is based on reducing guaranteed bit rate; and
   in that for interactive or streaming traffic, the procedure for reducing quality of service is based on the processing priority that has been requested for the traffic; and
   in that if the requested equivalent passband is still not available when the quality of service is reduced, then said means for reducing quality of service propose a background class of traffic to the user.

8. A UMTS network node according to claim 5, characterized in that it further comprises means for use, if the quality of service of a call is less than that requested, to compare periodically the sum of the equivalent passband requested for the new call and the equivalent passband for all of the calls already set up in the UMTS network node with a predetermined maximum value, and to offer a better quality of service if resources have become available.

* * * * *